US011527092B1

(12) United States Patent
Farber et al.

(10) Patent No.: US 11,527,092 B1
(45) Date of Patent: Dec. 13, 2022

(54) SYSTEM FOR DETERMINING EMBEDDING USING SPATIAL DATA

(71) Applicant: AMAZON TECHNOLOGIES, INC., Seattle, WA (US)

(72) Inventors: Miriam Farber, Haifa (IL); Manoj Aggarwal, Seattle, WA (US); Gerard Guy Medioni, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 111 days.

(21) Appl. No.: 17/099,074

(22) Filed: Nov. 16, 2020

(51) Int. Cl.
*G06V 40/10* (2022.01)
*G06T 5/20* (2006.01)
*G06T 5/00* (2006.01)
*G06N 3/08* (2006.01)
*G06N 3/04* (2006.01)

(52) U.S. Cl.
CPC .......... *G06V 40/11* (2022.01); *G06N 3/0454* (2013.01); *G06N 3/08* (2013.01); *G06T 5/004* (2013.01); *G06T 5/20* (2013.01); *G06T 2207/20081* (2013.01); *G06T 2207/20084* (2013.01); *G06T 2207/20201* (2013.01)

(58) Field of Classification Search
None
See application file for complete search history.

(56) References Cited

U.S. PATENT DOCUMENTS

| 10,318,917 | B1 * | 6/2019 | Goldstein | G06Q 20/203 |
| 10,599,933 | B2 * | 3/2020 | Hama | G06V 40/1394 |
| 10,872,221 | B2 * | 12/2020 | Kumar | G06F 21/32 |
| 2015/0356339 | A1 * | 12/2015 | Demos | H04N 5/2354 |
| | | | | 348/77 |

(Continued)

FOREIGN PATENT DOCUMENTS

| CN | 110555399 | * | 12/2019 |
| CN | 111340103 | * | 2/2020 |
| CN | 109697347 | * | 7/2020 |

OTHER PUBLICATIONS

Fiaz et al, Learning Soft Mask Based Feature Fusion with Channel and Spatial Attention for Robust Visual Object Tracking, Sensors 2020, 20, 4021; doi: 10.3390/s20144021 (Year: 2020).*

(Continued)

*Primary Examiner* — Andrae S Allison
(74) *Attorney, Agent, or Firm* — Lindauer Law, PLLC (57) ABSTRACT

Images of a hand may be used to identify users. Quality, detail, and so forth of these images may vary. An image is processed to determine a first spatial mask. A first neural network comprising many layers uses the first spatial mask at a first layer and a second spatial mask at a second layer to process images and produce an embedding vector representative of features in the image. The first spatial mask provides information about particular portions of the input image, and is determined by processing the image with an algorithm such as an orientation certainty level (OCL) algorithm. The second spatial mask is determined using (Continued)

unsupervised training and represents weights of particular portions of the input image as represented at the second layer. The use of the masks allows the first neural network to learn to use or disregard particular portions of the image, improving overall accuracy.

21 Claims, 6 Drawing Sheets

(56) References Cited

U.S. PATENT DOCUMENTS

| | | | |
|---|---|---|---|
| 2015/0356362 A1* | 12/2015 | Demos | G06V 40/70 382/115 |
| 2017/0091568 A1* | 3/2017 | Hama | G06V 10/42 |
| 2019/0147287 A1* | 5/2019 | Glover | G06V 10/422 382/209 |
| 2019/0188448 A1* | 6/2019 | Kim | G06V 40/50 |
| 2019/0278895 A1* | 9/2019 | Streit | G06N 3/08 |
| 2019/0392189 A1* | 12/2019 | Kumar | G06V 40/70 |
| 2020/0044852 A1* | 2/2020 | Streit | H04L 9/3231 |
| 2021/0382970 A1* | 12/2021 | Odinokikh | G06N 3/0454 |

OTHER PUBLICATIONS

Uppal, Hardik, et al. "Two-level attention-based fusion learning for rgb-d face recognition." 2020 25th International Conference on Pattern Recognition (ICPR). IEEE, 2021. (Year: 2021).*

Song et al , Finger-Vein Recognition Based on Deep DenseNet Using Composite Image, Digital Object Identifier 10.1109/ACCESS. 2019.2918503 (Year: 2019).*

Narasimhaswamy, Supreeth, Trung Nguyen, and Minh Hoai Nguyen. "Detecting hands and recognizing physical contact in the wild." Advances in neural information processing systems 33 (2020): 7841-7851. (Year: 2020).*

Bello, et al., "Attention Augmented Convolutional Networks", Google Brain, 13 pgs. Retrieved from the Internet: URL: https://arxiv.org/pdf/1904.09925.pdf.

Huang, et al., "Densely Connected Convolutional Networks", Cornell University, pp. 1-9. Retrieved from the Internet: URL: https://arxiv.org/pdf/1608.06993.pdf.

Olah, et al., "Attention and Augmented Recurrent Neural Networks", Distill, 2016, 16 pgs. Retrieved from the Internet: URL: https://web.stanford.edu/class/cs379c/archive/2018/class_messages_listing/content/Artificial_Neural_Network_Technology_Tutorials/OlahandCarterATTENTION-TUTORIAL-16.pdf.

Partheeba, et al., "Fingerprint bio-Crypto key generation using Scale Invariant Feature Transform (SIFT)", International Journal of Computer Applications (0975-8887), vol. 153, No. 8, Nov. 2016, pp. 35-41. Retrieved from the Internet: URL: https://www.ijcaonline.org/archives/volume153/number8/partheeba-2016-jca-912129.pdf.

Saha, Sumit, "A Comprehensive Guide to Convolutional Neural Networks—the ELI5 way", Towards Data Science, Dec. 15, 2018, 12 pgs. Retrieved from the Internet: URL: https://towardsdatascience.com/a-comprehensive-guide-to-convolutional-neural-networks-the-eli5-way-3bd2b1164a53.

Xie, et al., "An Optimal Orientation Certainty Level Approach for Fingerprint Quality Estimation", Second International Symposium on Intelligent Information Technology Application,2008, IEEE, pp. 722-726. Retrieved from the Internet: URL: https://www.researchgate.net/publication/229008929_An_Optimal_Orientation_Certainty_Level_Approach_for_Fingerprint_Quality_Estimation.

* cited by examiner

SYSTEM FOR DETERMINING EMBEDDING USING SPATIAL DATA

BACKGROUND

Biometric data may be used for recognition of an individual.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a materials handling facility (facility), office, transportation facility, or other location may be controlled based on user identity. As the user enters the facility, the user may be identified using the devices and techniques described herein. In another example, a point-of-sale system may use the system described herein to identify a user and determine a payment account to be used for goods or services.

Traditional systems for identifying users suffer from several significant drawbacks including susceptibility to fraud, lack of speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred. However, traditional systems lack an awareness as to which features are pertinent to identification.

Described in this disclosure is a system that trains and utilizes a neural network using a plurality of spatial masks to process an input image and determine embedding vector data that is representative of features presented in the input image. For example, the neural network may comprise a convolutional neural network including a plurality of convolution layers, a plurality of pooling layers, and so forth. As a result of the training, the embedding vector data is particularly suited to represent features that distinguish one user from another.

During training, the neural network uses a first spatial mask and a second spatial mask. Each spatial mask provides information about a particular portion or "patch" of the corresponding input image. For example, the input image may be divided into a 10×10 grid of portions, each portion corresponding to a group of pixels in the input image.

The first spatial mask may be determined by processing the input image, or information derived therefrom, with one or more algorithms. For example, an orientation certainty level algorithm may be used to determine information about the relative presence and orientation of features in the input image, such as ridges on a palm or veins in a hand. The additional input provided by the first spatial mask allows associated layer(s) of the neural network to be trained in a supervised fashion.

The system may use information in the first spatial mask to assess a quality of the input image, and whether the input image is to be processed. For example, values associated with the first spatial mask may be averaged to produce an average value of the first spatial mask. If the average value is greater than a threshold value, the associated input image may be processed. If the average value is less than or equal to the threshold value, the associated input image may be disregarded.

The second spatial mask may be determined as a result of unsupervised training of the neural network. The neural network processes the input image with a second layer to produce second layer data. Loss terms are calculated for the second layer data associated with corresponding portions of the input image. The second spatial mask may comprise weighted averages of these loss values. By using a weighted average, the neural network is able to assign greater weight values to portions of the input image that are deemed more useful to determine embedding vector data associated with identification. For example, the neural network may learn that the patch at coordinates (4, 7) in our 10×10 grid should be weighted more heavily as it results in embedding vectors that are more readily distinguished between different users.

A combined spatial mask may be determined that uses information from the first spatial mask and the second spatial mask. For example, the first spatial mask may be multiplied by the second spatial mask to produce the combined spatial mask. The combined spatial mask may be used for subsequent processing by the neural network. For example, the combined spatial mask may be used to determine one or more weights at one or more layers of the neural network. In some implementations the combined spatial mask may be used by the trained neural network. For example, the combined spatial mask may be representative of one or more weights associated with one or more layers of the neural network.

As described above, the system may be used to determine particular portions of the input image that are to be considered in determining the embedding vector data. The system may also be used to determine how to combine information from a plurality of input images. For example, a first input image of a first user may have a first combined spatial mask while a second input image of the first user may have a second combined spatial mask. The portions of the first and second input images that have the greatest combined spatial mask values may be combined, resulting in a combined input image. This combined image is a composite of the "best" portions of the first and second input images, providing additional information for subsequent determination of embedding vector data.

By using the techniques described herein, the system provides substantially improved accuracy in identifying a user based on biometric features. During training, the first spatial mask provides one or more additional channels of information into the neural network increasing the amount of data used to inform the weighting at the corresponding layer(s) of the neural network. Meanwhile the second spatial mask improves the ability of the deep neural network to learn which portions of the input image(s) are associated with the best loss function for the corresponding layers(s) of the neural network.

Once trained, the resulting embedding vector data may be used to identify a previously enrolled user. For example, during an enrollment process the user opts in and presents their hand to a scanner. One or more images of the hand are acquired, and the neural network is used to determine first embedding vector data that is stored as enrolled user data. The first embedding vector data may be associated with a first point in a vector space. At a later time, the user presents their hand again and second embedding vector data is determined and associated with a second point in a vector space. If the second point within the vector space is closest to the first point, and the distance between the first point and the second point is less than a threshold value, the identity associated with the first point of the previously enrolled user may be asserted to the user presenting their hand at the later time.

Illustrative System

Figure 1:
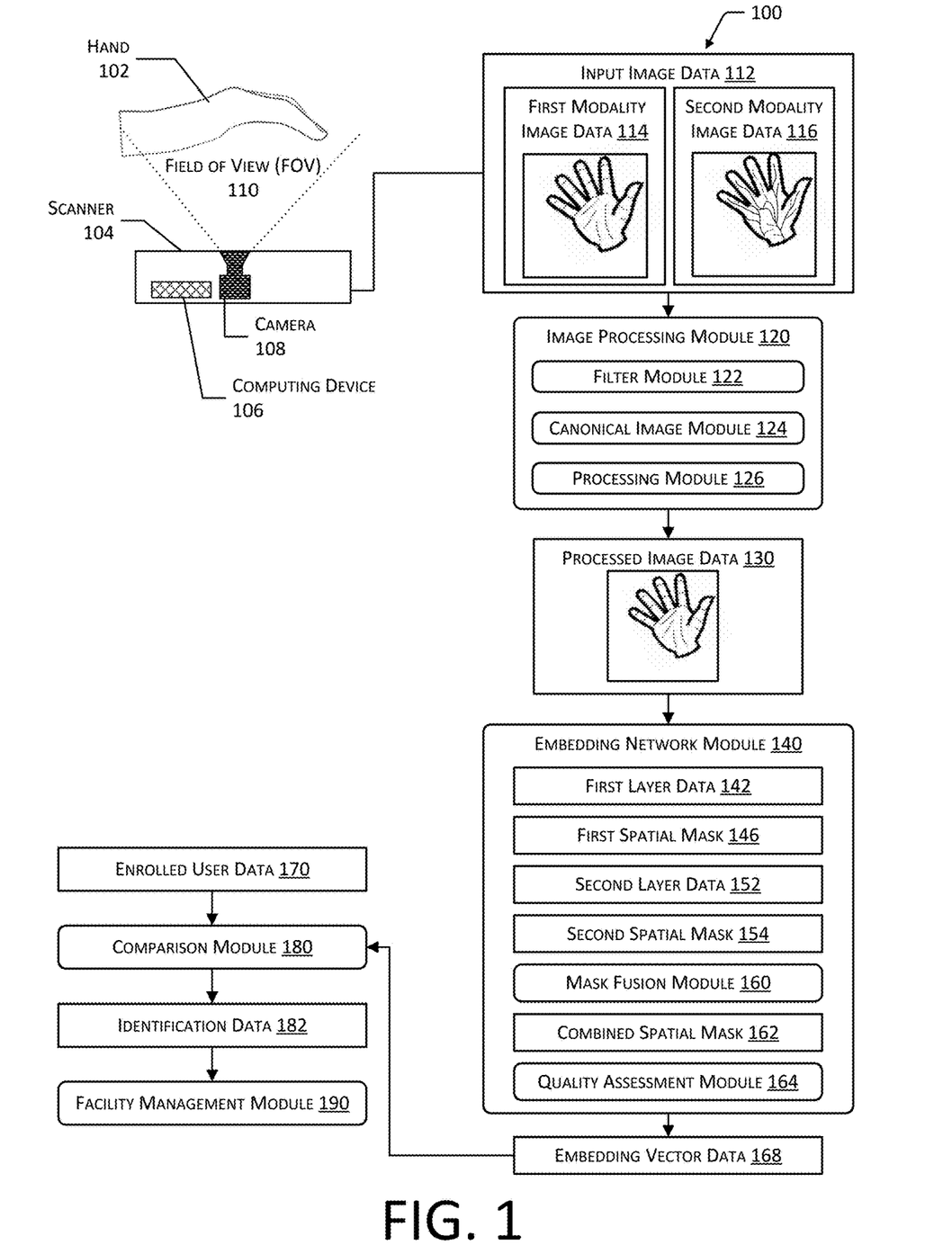
FIG. 1 illustrates a system that uses a plurality of spatial masks to determine embedding vector data that is representative of features present in an image, according to some implementations.

A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112 obtained using two or more modalities. The scanner 104 may include other components which are not shown. For example, the scanner 104 may include lights that illuminate the object in the FOV 110.

In the implementation depicted, the hand 102 is held above the camera 108, with the FOV 110 extending upward. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. In other implementations, other configurations may be used. For example, the camera 108 may have the FOV 110 extending downwards, and the user may place their hand 102 in the FOV 110 under the scanner 104.

The scanner 104 is configured to acquire multimodal images of the hand 102. A first modality may acquire images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may acquire images in which the hand 102 is illuminated with light having a second polarization and obtained by the camera 108 with the polarizer passing light to the camera 108 with the first polarization. For example, the second modality features may include anatomical structures such as veins, bones, soft tissue, or other sub-surface features. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame.

The user may place their hand 102 within the FOV 110 in various poses, distances, translations, and so forth. While in the FOV 110, the hand 102 may move as well. The pose of the hand 102 may indicate the rotation of the hand 102 relative to the camera 108 and the articulation of the joints in the hand 102. For example, the pose may be that the hand 102 is rotated with a yaw of −2 degrees, pitch of +5 degrees, and roll of −7 degrees and an articulation in which the fingers are together. The distance may comprise the distance between the camera 108 and the hand 102. For example, the distance may vary from zero in which the hand 102 is in contact with the scanner 104 to several meters in which the hand 102 may be too far away for a useful image to be acquired. The translation indicates the translation or apparent position of the hand 102 in a plane that is perpendicular to an optical axis extending away from the camera 108. For example, if the hand 102 is not centered directly above the camera 108, the resulting input image data 112 may show the hand 102 to be translated away from the center of the input image.

In the implementation depicted here, the scanner 104 does not include a guide, scan plate, or other structure that constrains the pose or position of the hand 102. For example, the user may move their hand 102 within the FOV 110 freely, rotating, translating, changing articulation, and so forth without constraint. As a result, the appearance of the hand 102 in the input image data 112 may vary considerably due to changes in articulation, pose, distance, translation, and so forth.

In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image. However, even in the situations involving the guide, the user 102 may not be fully constrained. For example, the user may place their hand 102 in different articulations such as fingers together, fingers apart, and so forth. The user may also fail to place their hand 102 in the preferred position with regard to the guide, for example only having an edge of their hand 102 in contact with the scan plate while the rest is elevated producing a rotation of the hand 102 with respect to the camera 108. As a result, the input image data 112 may vary considerably, even with the structure to guide the user's hand 102.

An image processing module 120 may receive the input image data 112 and perform additional processing. For example, a filter module 122 of the image processing module 120 may apply one or more filters to the input image data 112. In another example, the image processing module 120 may align the first modality image data 114 and the second modality image data 116. This alignment may include one or more of rotation or translation of a portion of the images.

In some implementations the image processing module 120 may include a multimodal image module that may be used to generate actual multimodal image data (AMID). The multimodal image module may generate the AMID by combining data from two or more modality images into a single image. For example, the first modality image data 114 and the second modality image data 116 may each comprise grayscale images. The multimodal image module may combine the two images to generate the AMID. For example, first grayscale data from the first modality image data 114 may be stored as a first channel of the AMID while second grayscale data from the second modality image data 116 may be stored as a second channel of the AMID.

The image processing module 120 may comprise a canonical image module 124. For example, the canonical image module 124 may accept as input the input image data 112 and provide as output canonical image data. In some implementations the canonical image module 124 may comprise a neural network that has been trained to generate canonical image data as output. The canonical image data represents the input image data 112 with one or more of a predetermined pose relative to the camera 108 of the scanner 104, predetermined articulation of the hand 102, predetermined illumination, predetermined scale, or other characteristic. For example, the input image data 112 may depict the hand 102 of the user slightly tilted and off-center relative to the FOV 110, with the fingers together. The canonical image data may depict the same hand in a canonical pose with no tilt and centered in the image, a canonical articulation in which the fingers are splayed apart, and so forth.

The image processing module 120 may include a processing module 126. The processing module 126 determines additional information for use by the embedding network module 140. In one implementation, the processing module 126 may use one or more algorithms to determine the processed image data 130 from the input image data 112.

In one implementation, the processing module 126 may determine orientation certainty level (OCL) data for portions or "patches" of the input. For example, a gradient vector may be determined based on pixel values within a specified portion of the processed image data 130. A first eigenvalue and a second eigenvalue associated the gradient vector may be determined. The OCL data may be determined for the specified portion based on the first eigenvalue and the second eigenvalue. One implementation of the OCL algorithm is described by Partheeba, S., Radha, N., "Fingerprint bio-Crypto key generation using Scale Invariant Feature Transform (SIFT)", International Journal of Computer Applications, (Vol. 153, No. 8, p. 35, November 2016).

The image processing module 120 provides as output processed image data 130. The processed image data 130 is provided to an embedding network module 140.

Figure 2:
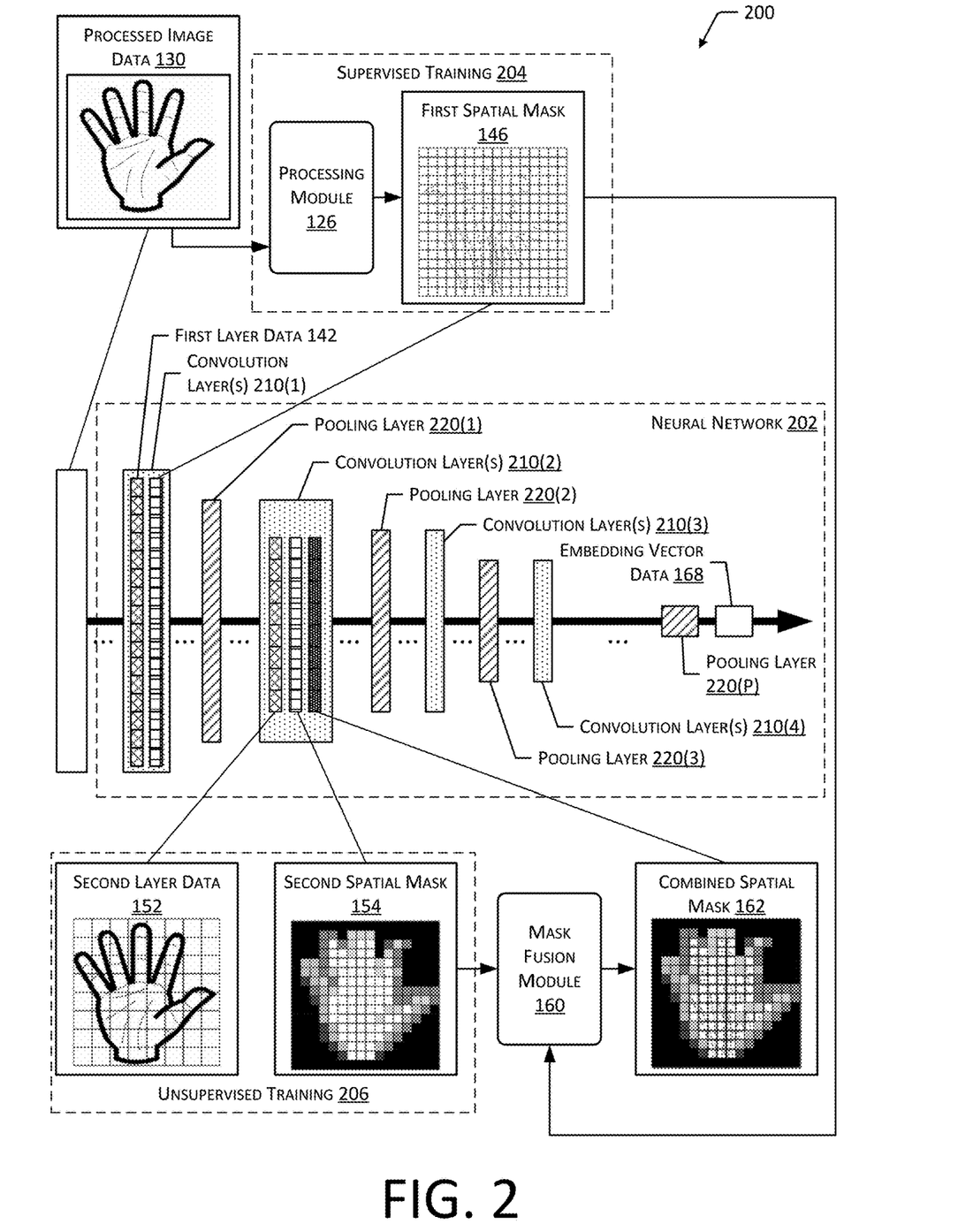
FIG. 2 is a block diagram of a portion of a neural network that uses a first spatial mask and a second spatial mask to determine embedding vector data, according to some implementations.

The embedding network module 140 may comprise a deep learning system, such as a convolutional neural network. The convolutional neural network may utilize a margin-loss based model for training. One implementation of margin-loss models for training neural networks is described by Gao, R., Yang, F., Yang, W., & Liao, Q. "Margin loss: Making faces more separable", IEEE Signal Processing Letters, 25(2), 308-312, 2018. Another implementation of margin-loss models for training convolutional neural networks is described by Liu, W., Wen, Y., Yu, Z., & Yang, M., "Large-margin soft max loss for convolutional neural networks". International Conference on Machine Learning, (Vol. 2, No. 3, p. 7, June 2016). The embedding network module 140 is discussed in more detail with regard to HE 2.

The embedding network module 140 may include a plurality of layers. These layers may include convolutional layers, pooling layers, and so forth. The processed image data 130 may be provided as input. A first layer of the neural network may process the processed image data 130 or data based thereon to determine first layer data 142.

A first spatial mask 146 is determined based at least in part on output from the processing module 126. For example, the OCL values that correspond to a particular portion of the processed image data 130 may be stored as a first spatial mask 146. The OCL values may be indicative of the biometric information that is available within a specified portion. For example, a relatively large OCL value may be determined for a portion of the palm that has many ridges or veins, while a relatively low OCL value is determined for a portion corresponding to a white shirt cuff. In some implementations the first spatial mask 146 may be based on output from other algorithms. In other implementations other algorithms may be used by the processing module 126 to determine the first spatial mask 146. For example, a mean-squared error (MSE) algorithm may be used to measure the average squared difference between actual and previously specified pixel values in the input image. In other examples, a blur detection algorithm may be used to determine information indicative of blurriness.

During training, the first spatial mask 146 may be used by the embedding network module 140 as labeled data, facilitating supervised learning of the network. The first spatial mask 146 provides an additional channel of data that improves performance of the embedding network module 140. The first spatial mask 146 may include a plurality of channels. For example, channels may contain information about cosine, sine, reliability, or other metrics associated with the OCL data.

A second layer of the neural network may process the output from the first layer, such as the first layer data 142 or data based thereon to produce second layer data 152. The second layer data 152 is used to determine a second spatial mask 154. During operation, the network uses unsupervised learning at the second layer to determine weights that are associated with particular portions of the input to the second layer. In one implementation, the second spatial mask 154 is representative of a weighted average of a loss value associated with the second layer data 152. During subsequent operation of the trained neural network, the second spatial mask 154 is determined that is representative of the processed image data 130.

A mask fusion module 160 may be used to determine a combined spatial mask 162 based on the first spatial mask 146 and the second spatial mask 154. The mask fusion module 160 may use one or more operations to determine the combined spatial mask 162. In one implementation, the first spatial mask 146 may be multiplied by the second spatial mask 154 to determine the combined spatial mask 162. In another implementation, one or more weight values may be used to combine the first spatial mask 146 and the second spatial mask 154. For example, values in the first spatial mask 146 may be multiplied by a first weight of 0.4 while the values in the second spatial mask 154 may be multiplied by a second weight of 0.6, with the resulting values summed to produce the combined spatial mask 162.

In some implementations the first spatial mask 146 and the second spatial mask 154 may have different dimensions. The mask fusion module 160 or other module may adjust the dimensionality of one or more of the first spatial mask 146 or the second spatial mask 154 to facilitate the determination of the combined spatial mask 162. For example, the mask fusion module 160 may downsample, pool, or otherwise modify the dimensionality of the first spatial mask 146 to correspond to the dimensionality of the second spatial mask 154.

The combined spatial mask 162 may then be used to process the processed image data 130 and determine the embedding vector data 168. For example, values associated with particular portions of the combined spatial mask 162 may be used to set weights used in subsequent layers of the neural network. Continuing the example, portions of the processed image data 130 that are associated with greater weight values may contribute more heavily to the embedding vector in the embedding vector data 168 than those portions that are associated with lesser weights.

In some implementations the embedding network module 140 may include a quality assessment module 164. The quality assessment module 164 may use one or more of the first spatial mask 146, the second spatial mask 154, or the combined spatial mask 162 to determine whether processed image data 130 contains sufficient information that would be useful for further processing. For example, a mask metric may be determined for a spatial mask associated with a particular processed image data 130. If the mask metric is greater than a threshold value, processing of the processed image data 130 by the embedding network module 140 may proceed. Otherwise, the processed image data 130 may be discarded. Operation of the quality assessment module 164 is discussed in more detail with regard to FIG. 3.

The embedding network module 140, once trained, provides as output embedding vector data 168. The embedding vector data 168 comprises information that is representative of the features presented in the processed image data 130.

During an enrollment process, the user may opt in to use the system 100 and presents their hand 102 to produce input image data 112. Enrolled user data 170 may be stored that comprises one or more of the processed image data 130, associated embedding vector data 168, name, and additional information. For example, the additional information may comprise name, contact information, demographic data, payment account information, and so forth. The embedding vector data 168 may act as a "signature" that is uniquely associated with the identity of the user. During the enrollment process, a comparison module 180 may be used to determine whether the user has been previously enrolled.

During subsequent usage, the (as yet unidentified) user presents their hand 102 at a scanner 104. The resulting input image data 112 may be processed by at least a portion of the embedding network module 140 to determine first embedding vector data 168. The comparison module. 180 compares the first embedding vector data 168 to the embedding vector data 168 stored in the enrolled user data 170 to determine identification data 182. In one implementation, the identification data 182 may comprise a user identifier associated with the closest embedding vector data 168 in the enrolled user data 170 to the first embedding vector data 168 associated with the user who presented their hand 102. The comparison is discussed in more detail with regard to FIG. 5.

By utilizing the spatial masks, the embedding network module 140 is able to provide as output embedding vector data 168 that is representative of features in the processed image data 130 that are most likely to facilitate distinguishing one user from another. Because of this improvement in the embedding vector data 168, the accuracy of the comparison module 180 is substantially improved.

The identification data 182 may provide information such as one or more of a user identifier associated with the user, a location or identification of the scanner 104, data indicative of date and time that the input image data 112 was obtained, and so forth. The identification data 182 may be subsequently used for various purposes. For example, if the user has been granted access to the facility, a command may be issued to open a gate or door so the user may enter the facility. In another example, the identification data 182 may be used to determine a payment account or other credentials associated with the user which may then be used in a financial transaction. In yet another example, the identification data 182 may be passed to a facility management module 190.

The facility management module 190 may use the identification data 182 to associate an identity with that user as they move about the facility. For example, the facility management module 190 may use data from cameras or other sensors in the environment to determine a location of the user. Given a known path of the user from the gate, the user identity indicated in the identification data 182 may be associated with the user as they use the facility. For example, the now identified user may walk to a shelf, remove an item, and leave the facility. The facility management module 190 may determine the interaction data indicative of the removal of the item as being associated with the user identifier specified in the identification data 182, and bill an account associated with the user identifier.

The systems and techniques described above are discussed with respect to images of human hands. These systems and techniques may be used with respect to other forms of data, other kinds of objects, and so forth.

FIG. 2 is a block diagram 200 of a portion of a neural network 202 that uses a first spatial mask 146 and a second spatial mask 154 to determine embedding vector data 168, according to some implementations. The embedding network module 140 may comprise the neural network 202. The neural network 202 may comprise a convolutional neural network with a plurality of layers. A convolution layer 210 may perform a convolution operation on data that is provided at an input. Output from the convolution layer 210 may be combined by a pooling layer 220. The convolution layer 210 may serve to extract information about features corresponding with the data at that layer. The pooling layer 220 may have various results, such as reducing the spatial size of the extracted information from the convolution layer 210, decreasing noise, and so forth. For ease of illustration, and not necessarily as a limitation, four convolution layers 210(1), 210(2), 210(3) and 210(4) are depicted while pooling layers 220(1), 220(2), . . . , 220(P) are shown. The quantity and arrangement of the layers are shown for illustration only, and not necessarily as a limitation. For example, additional convolution layers 210, pooling layers 220, or other layers may be present.

In the implementation depicted here, the first layer data 142 is associated with a first layer of the neural network 202. The first layer may comprise a last (or deeper) layer in the neural network 202 having a desired dimensionality for processing. The desired dimensionality may be determined based on one or more factors such as relative size of features in the processed image data 130, and so forth.

In this illustration, the first layer data 142 may be processed by the processing module 126 to determine the first spatial mask 146. For example, the processing module 126 may use an OCL algorithm to determine OCL data for respective portions of the first layer data 142. In another implementation, not shown, the processed image data 130 may be processed by the processing module 126. During training of the neural network 202, the first spatial mask 146 may be used as label data to facilitate supervised training 204 of the neural network 202.

In the implementation depicted here, the second layer data 152 is associated with a second layer of the neural network 202. The second spatial mask 154 is determined by the second layer data 152. The determination of the second spatial mask 154 may result from unsupervised training 206 of the neural network 202. In this implementation the first layer is before the second layer in the neural network 202. For example, the first layer may have a first dimensionality that is greater than a second dimensionality of the second layer, and output from the first layer may be represented in the input to the second layer. By placing the operations associated with the first layer before the second layer, the neural network 202 takes into account the first spatial mask 146 that is representative of finer features that may otherwise be obscured or lost by subsequent layers of the neural network 202. In other implementations, the second layer may be before the first layer in the neural network 202.

As shown in the implementation depicted here, during operation of the neural network 202 to process the processed image data 130, the first spatial mask 146 and the second spatial mask 154 are determined. The mask fusion module 160 may combine these to determine the combined spatial mask 162. During processing by the neural network 202 at layers greater than or equal to the second layer, the neural network 202 may use the combined spatial mask 162 to process the processed image data 130. This allows the neural network 202 to consider different portions or patches of the processed image data 130 or information derived therefrom, in determining the embedding vector data 168.

Figure 3:
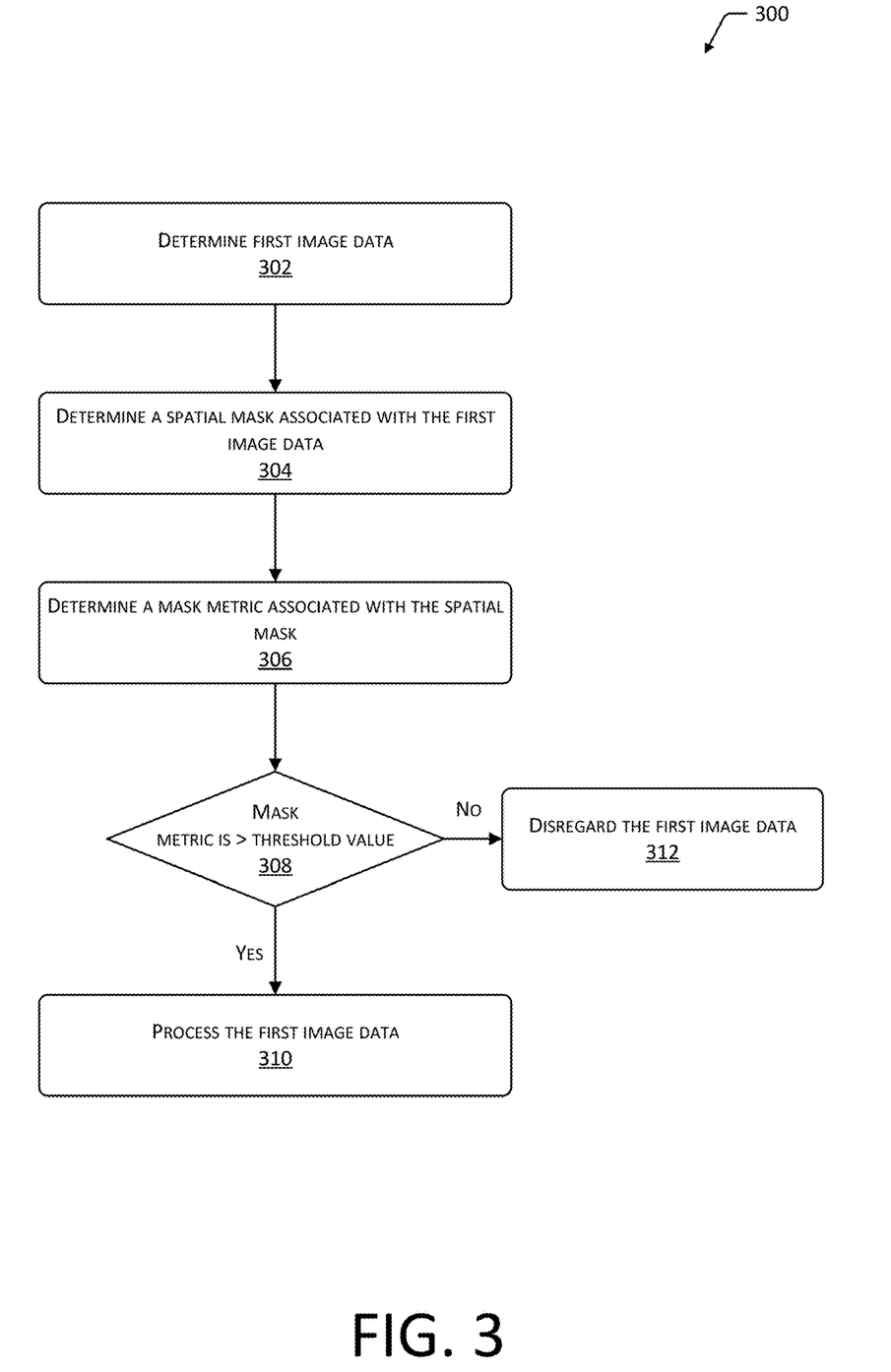
FIG. 3 is a flow diagram of a process to assess image data using a mask metric associated with one or more spatial masks, according to some implementations.

FIG. 3 is a flow diagram 300 of a process to assess image data using a mask metric associated with one or more spatial masks, according to some implementations. In some implementations, information in, or derived from the first spatial mask 146 may be used to assess the quality of the input image data 112. In some implementations, the quality assessment module 164 may implement at least a portion of this process.

At 302 first image data is determined. For example, the scanner 104 may acquire first input image data 112.

At 304 a first spatial mask 146 associated with the first input image data 112 is determined. For example, the first input image data 112 may be processed using an OCL algorithm to determine OCL data for a plurality of portions of the first input image data 112.

At 306 a mask metric associated with the first spatial mask 146 is determined. For example, the mask metric may comprise one or more of a sum, average, standard deviation, and so forth. For example, the mask metric may comprise an average value of the OCL values. The mask metric may comprise information that is indicative of an aggregate level of detail within the associated first input image data 112. For example, an increase in the detail of features within the associated first input image data 112 may correspond to an increase in average OCL value.

At 308 the mask metric is compared to a threshold value. The threshold value may be determined based on testing or tuning of operation of the embedding network module 140. If the mask metric is greater than threshold value, the process may proceed to 310. If the mask metric is less than or equal to the threshold value, the process may proceed to 312.

At 310 the first input image data 112 or data derived therefrom is processed. For example, the image processing module 120 may determine the processed image data 130 and send the processed image data 130 to the embedding network module 140 for further processing.

At 312 the first input image data 112 may be disregarded from further processing. For example, the image processing module 120 may not send the processed image data 130 for the disregarded first input image data 112 to the embedding network module 140.

Figure 4:
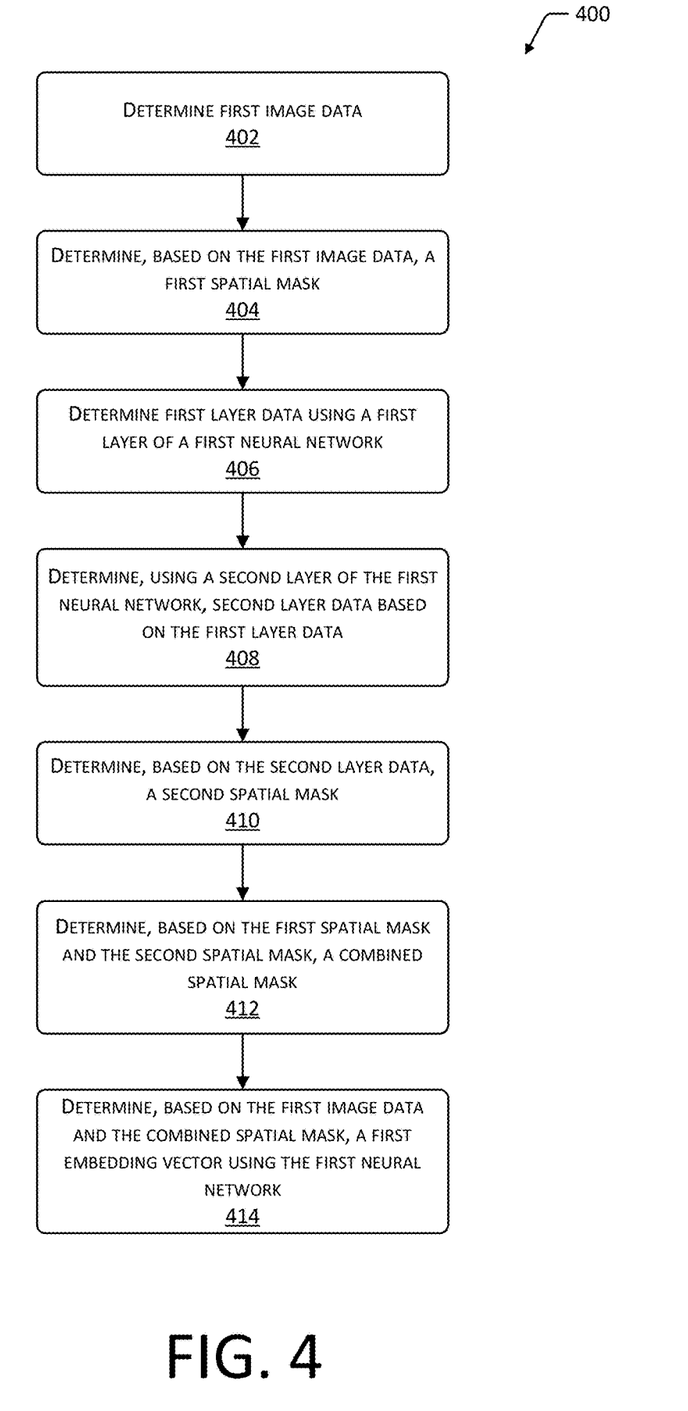
FIG. 4 is a flow diagram of a process to operate a neural network using a plurality of spatial masks, according to some implementations.

FIG. 4 is a flow diagram 400 of a process to operate a neural network 202 using a plurality of spatial masks, according to some implementations. The process may be implemented at least in part by the embedding network module 140.

At 402 first image data is determined. For example, input image data 112 may be acquired by the scanner 104 and processed by the image processing module 120 to determine the processed image data 130. In some implementations the first image data may comprise canonical image data. For example, the canonical image module 124 may accept the input image data 112 as input and provide as output canonical image data. The canonical image data may depict the portion of the user, such as a hand 102, in one or more of a predetermined pose relative to the scanner 104, a predetermined articulation, a predetermined illumination, or a predetermined scale.

At 404 a first spatial mask 146 is determined based on the first image data. In one implementation, the input image data 112 may be processed by the processing module 126 with an OCL algorithm to determine the first spatial mask 146. For example, for portions of the first image data a gradient vector is determined based on values of pixels within a specified portion. A first eigenvalue associated with the gradient vector is determined. A second eigenvalue associated with the gradient vector is determined. An orientation certainty level (OCL) value for the specified portion is determined based on the first eigenvalue and the second eigenvalue.

At 406 first layer data 142 is determined using a first layer of a first neural network 202 that processes the first image data. For example, the processed image data 130 may be provided as input to the embedding network module 140. As described above, in some implementations the first layer may comprise a layer of a convolutional neural network. During training, the first layer may be trained using supervised training 204 with the first spatial mask 146 provides the labeled data.

At 408, using a second layer of the first neural network 202, determine second layer data 152 based on the first layer data 142. During training, the second layer may be trained using unsupervised training 206.

At 410, based on the second layer data 152, the first neural network 202 determines a second spatial mask 154.

At 412 a combined spatial mask 162 is determined based on the first spatial mask 146 and the second spatial mask 154. For example, the mask fusion module 160 may be used to multiply the first spatial mask 146 and the second spatial mask 154 to determine the combined spatial mask 162.

At 414 a first embedding vector 168 is determined based on the first image data and the combined spatial mask 162. For example, the input image data 112 is processed by the first neural network 202 with the combined spatial mask 162 providing information during processing about which portions of the input image data 112 and data derived therefrom to be weighted more or less heavily, based on an associated value of that portion as indicated by the combined spatial mask 162.

In implementations using a plurality of modalities, a separate embedding network module 140 may be trained and used for each modality. For example, a first embedding network module 140(1) may be trained using first modality image data 114. The first embedding network module 140(1) may generate a first combined spatial mask 162(1) that is associated with the first modality. Likewise, a second embedding network module 140(2) may be trained using second modality image data 116. The second embedding network module 140(2) may generate a second combined spatial mask 162(2) that is associated with the second modality.

Figure 5:
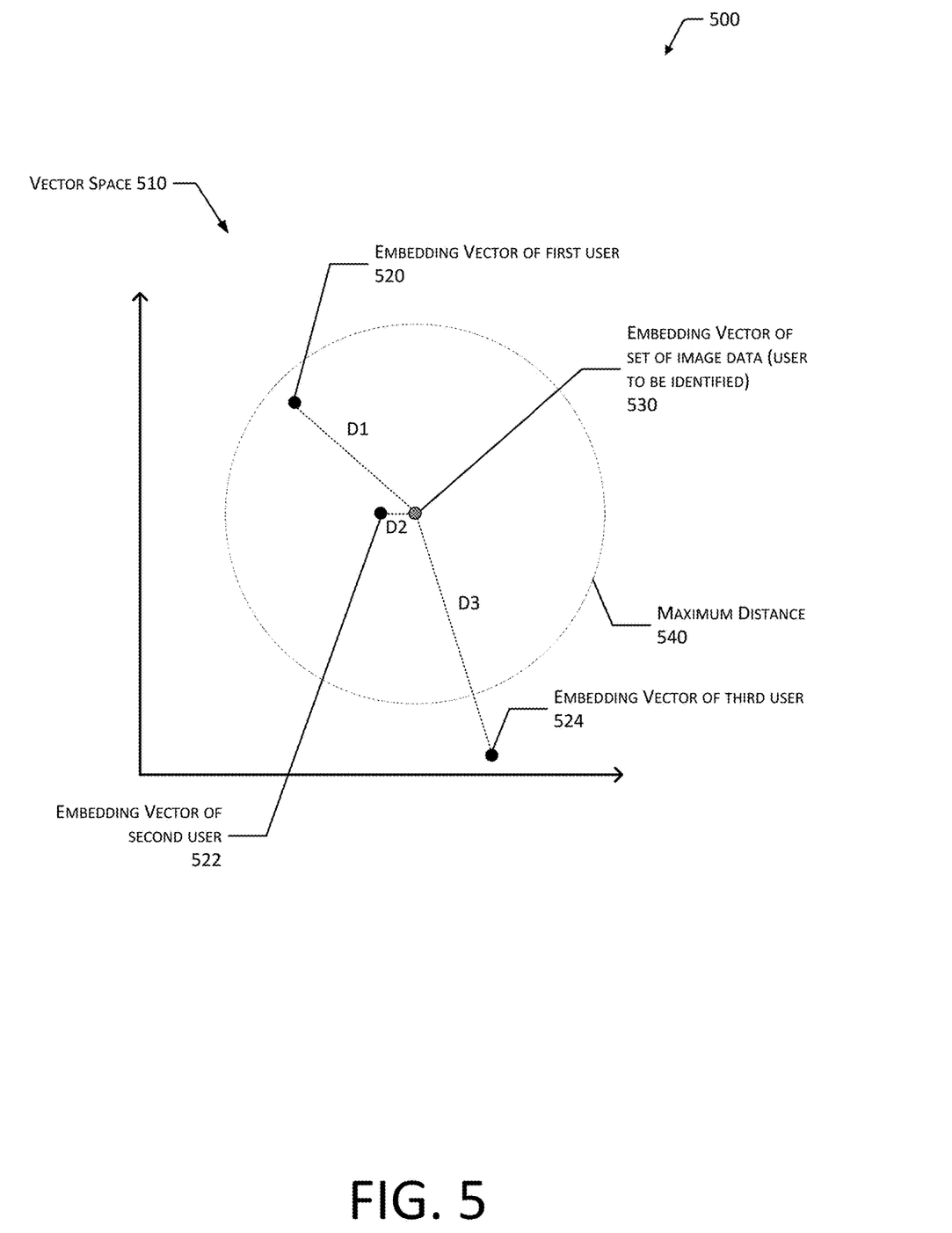
FIG. 5 illustrates relative points in vector space that are associated with embedding vector data that are used to recognize a particular user, according to some implementations.

FIG. 5 illustrates a graph 500 of a vector space 510 and relative points therein that are associated with embedding vector data 168 that are used to recognize a particular user, according to some implementations. The vector space 510 depicted is two-dimensional for ease of illustration and not by way of limitation. For example, the embedding network module 140 may express embedding vector data 168 within an n-dimensional space.

Points in the vector space 510 corresponding to an embedding vector of a first user 520, an embedding vector of a second user 522, and an embedding vector of a third user 524 are shown. An unidentified user has presented their hand 102 to the scanner 104, and input image data 112 has been processed to determine embedding vector data 168 representing the features in that input image data 112. A point for the embedding vector of the user to be identified is shown at 530.

The comparison module 180 may determine distances between the point in the vector space 510 that is associated with the embedding vector of the set of image data for the user to be identified 530 and points associated with other embedding vectors. A maximum distance 540 in the vector space 510 may be specified relative to a point associated with the embedding vector of the set of image data for the user to be identified 530. Identities corresponding to embedding vector data 168 of users in the enrolled user data 170 that are greater than the maximum distance 540 may be disregarded for consideration as possible identities. For example, the point associated with the embedding vector of the third user 524 is outside the maximum distance 540 and so the third user 524 is not deemed eligible for consideration. The point in the vector space 510 that is associated with the embedding vector of the set of image data for the user to be identified 530 is a third distance D3 from the point associated with the embedding vector of the third user 524.

Within the maximum distance 540, the point in the vector space 510 that is associated with the embedding vector of the set of image data for the user to be identified 530 is a first distance D1 from the point associated with the embedding vector of the first user 520 and a second distance D2 from the point associated with the embedding vector of the second user 522. The first distance D1 is greater than the second distance D2. The identity associated with the shortest distance may be used to determine the identity to assert. As a result, the user to be identified may be deemed to be the second user. In other implementations, other techniques may be used to compare embedding vector data 168 or information derived therefrom.

In some implementations the combined spatial mask 162 may be used by the comparison module 180 during operation. For example, the embedding vector data 168 may comprise a plurality of embedding vectors, each associated with a portion of the input image data 112. The combined spatial mask 162 may be used to determine a weight associated with associated portions in the determination of the identification data 182. These weights may be used to vary the relative importance of a portion with respect to the comparison. For example, first embedding vector data 168 associated with a first portion has a first weight as indicated by the combined spatial mask 162 and a second portion has a second weight as indicated by the combined spatial mask 162. If the second weight is greater than the first weight, second embedding vector data 168 associated with the second portion is given greater consideration than the first embedding vector data 168 associated with the first portion during the determination of the identification data 182. As a result, the combined spatial mask 162 allows for the features depicted in different portions of the input image data 112 to be emphasized or deemphasized during the comparison process.

Figure 6:
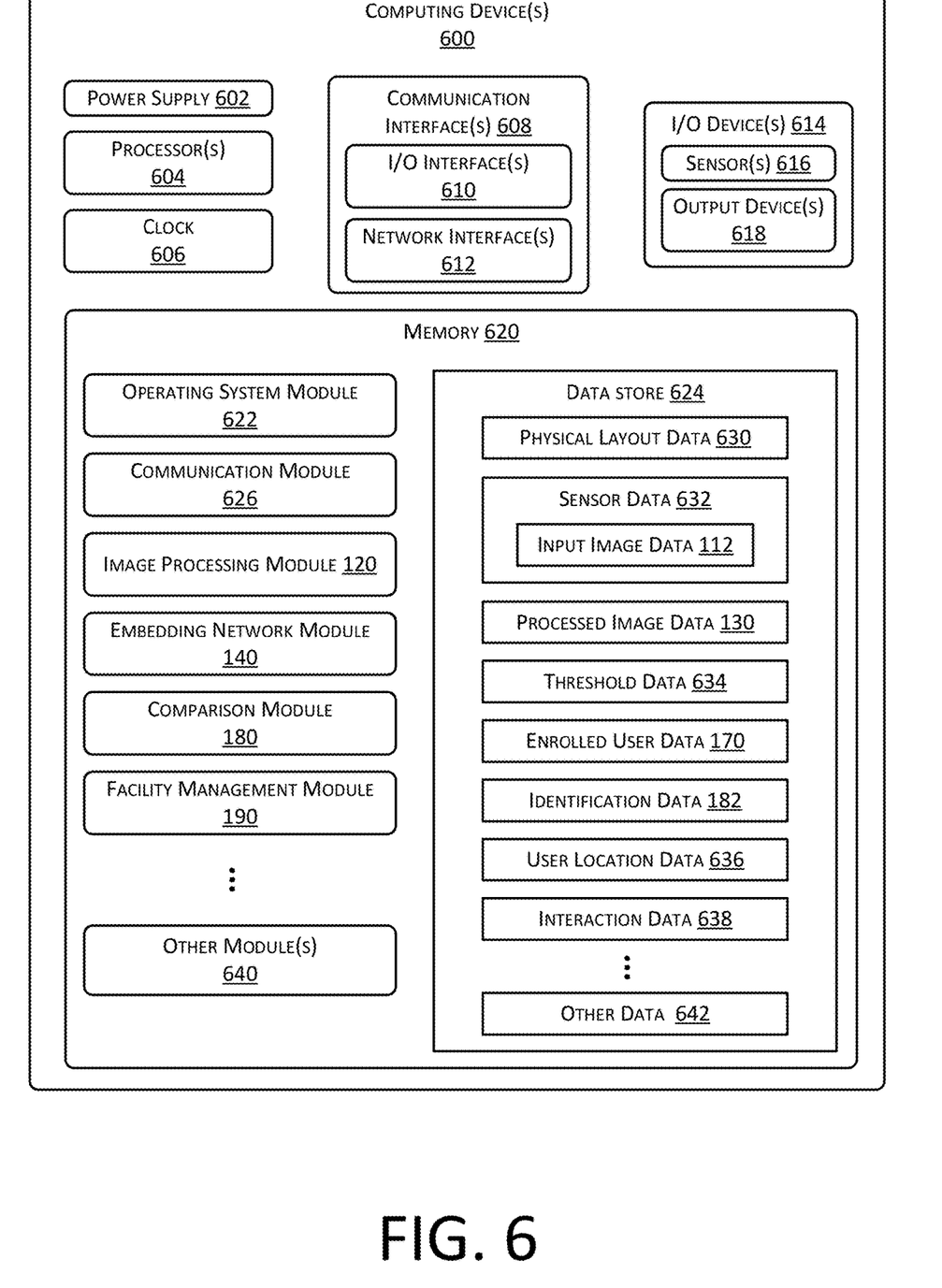
FIG. 6 is a block diagram of a computing device to use to determine embedding vector data based on aggregate data and recognize a user based on that embedding vector data, according to some implementations.

FIG. 6 is a block diagram of a computing device to determine embedding vector data 168 and recognize a user based on that embedding vector data 168, according to some implementations.

The computing device 600 may be within the scanner 104, may comprise a server, and so forth. The computing device 600 may be physically present at the facility, may be accessible by a network, or a combination of both. The computing device 600 does not require end-user knowledge of the physical location and configuration of the system that delivers the services. Common expressions associated with the computing device 600 may include "embedded system", "on-demand computing", "software as a service (SaaS)", "platform computing", "network-accessible platform", "cloud services", "data centers", and so forth. Services provided by the computing device 600 may be distributed across one or more physical or virtual devices.

One or more power supplies 602 may be configured to provide electrical power suitable for operating the components in the computing device 600. The one or more power supplies 602 may comprise batteries, capacitors, fuel cells, photovoltaic cells, wireless power receivers, conductive couplings suitable for attachment to a power source such as provided by an electric utility, and so forth. The computing device 600 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 600 may include one or more communication interfaces 608 such as input/output (I/O) interfaces 610, network interfaces 612, and so forth. The communication interfaces 608 enable the computing device 600, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the I/O devices 614 may be physically incorporated with the computing device 600 or may be externally placed.

The network interfaces 612 may be configured to provide communications between the computing device 600 and other devices, such as scanners 104, routers, access points, and so forth. The network interfaces 612 may include devices configured to couple to personal area networks (PANS), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The computing device 600 may also include one or more busses or other internal communications hardware or software that allow for the transfer of data between the various modules and components of the computing device 600.

As shown in FIG. 6, the computing device 600 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 600. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including the computing devices 600, network attached storage devices, and so forth.

A communication module 626 may be configured to establish communications with one or more of the scanners 104, sensors 616, display devices, other computing devices 600, or other devices. The communications may be authenticated, encrypted, and so forth.

The memory 620 may also store one or more of the image processing module 120, the embedding network module 140, or the comparison module 180, as described above.

The memory 620 may store the facility management module 190. The facility management module 190 may perform various functions, such as tracking items between different inventory locations, to and from carts, generating restocking orders, directing operation of robots within the facility, using the identification data 182 to associate a particular user identity with a user in the facility, and so forth. During operation, the facility management module 190 may access sensor data 632 such as one or more of image data from cameras, weight data from weight sensors, and so forth.

Information used by the facility management module 190 may be stored in the data store 624. For example, the data store 624 may be used to store physical layout data 630, sensor data 632, enrolled user data 170, identification data 182, user location data 636, interaction data 638, and so forth.

The physical layout data 630 may provide information indicative of where scanners 104, cameras, weight sensors, antennas for radio receivers, inventory locations, and so forth are in the facility with respect to one another. For example, the physical layout data 630 may comprise information representative of a map or floor plan of the facility with relative positions of gates with scanners 104 and inventory locations.

The sensor data 632 may comprise information obtained from one or more of the sensors 616 in or associated with the facility.

The enrolled user data 170 may comprise the embedding vector data 168 that is associated with particular user accounts. For example, the enrolled user data 170 may comprise first embedding vector data 168 for user "Bob", second embedding vector data 168 for user "Pat", and so forth.

The facility management module 190 may generate the user location data 636 that is indicative of the location of the user within the facility. For example, the facility management module 190 may use image data obtained by the cameras to determine a location of the user. In other implementations, other techniques may be used for determining the user location data 636. For example, data from a smart floor may be used to determine the location of the user.

A user identity may be associated with the user location data 636 based on the identification data 182. For example, the user enters the facility and has their palm scanned, producing identification data 182 that is indicative of their time of entry, a scanner 104 associated with where they entered, and their user identifier. The user location data 636 indicative of a path of a user that begins at the scanner 104 at the time of entry may be associated with the user identifier in the identification data 182.

Based on the user location data 636 and the interaction data 638, a particular interaction may be associated with an account of a particular user. For example, if the user location data 636 indicates that the user is present in front of inventory location 492 at time 17:47:20 and the interaction data 638 indicates a pick of a quantity of one item from an area on inventory location 492 at 17:47:27, the user may be billed for that pick.

The facility management module 190 may use the sensor data 632 to generate the interaction data 638. The interaction data 638 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 190 may generate interaction data 638 that indicates what item the user picked from a particular lane on a shelf, and then use this interaction data 638 to adjust the count of inventory stowed at that lane. The interaction data 638 may then be used to bill an account associated with the user identifier that is associated with the user who picked the item.

The facility management module 190 may process the sensor data 632 and generate output data. For example, based on the interaction data 638, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 640 may also be present in the memory 620 as well as other data 642 in the data store 624. For example, a billing module may use the interaction data 638 and the identification data 182 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the identification data 182. In another example, a robot may incorporate a scanner 104. The robot may use the identification data 182 to determine whether to deliver a parcel to the user, and based on the identification data 182, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:
1. A system comprising:
a memory, storing computer-executable instructions; and
one or more hardware processors to execute the computer-executable instructions to operate a first neural network using instructions to:
retrieve first image data acquired using a scanner, wherein the first image data represents an image of a hand;
determine, based on processing the first image data using a first algorithm, a first spatial mask that associates first weight values with respective portions of the first image data;
determine, using a first layer of the first neural network, first layer data based on the first image data;
determine, using a second layer of the first neural network, second layer data based on the first layer data;
determine, based on the second layer data, a second spatial mask that associates second weight values with respective portions of the second layer data;
determine, by multiplying the first spatial mask and the second spatial mask, a combined spatial mask; and
determine a first embedding vector using the first neural network and the combined spatial mask, wherein the combined spatial mask provides data indicative of relative weights of a plurality of portions of the first image data that are associated with embedding vector data that is suitable for identifying a user.

2. The system of claim 1, wherein the first algorithm determines, for portions of the first image data:
a gradient vector based on values within a specified portion;
a first eigenvalue associated the gradient vector;
a second eigenvalue associated with the gradient vector; and
an orientation certainty level (OCL) for the specified portion based on the first eigenvalue and the second eigenvalue.

3. The system of claim 1, wherein the first spatial mask is used as input to train the first layer and the second layer of the first neural network is trained using unsupervised training.

4. A system comprising:
a memory, storing computer-executable instructions; and
one or more hardware processors to execute the computer-executable instructions to:
determine first image data of at least a portion of a user;
determine, using a first algorithm to process the first image data, a first spatial mask;
determine, using a first layer of a first neural network, first layer data based on the first image data;
determine, using a second layer of the first neural network, second layer data based on the first layer data;
determine, based on the second layer data, a second spatial mask; and
determine a first embedding vector of the first image data using the first neural network, wherein the first embedding vector is based at least in part on the first spatial mask and the second spatial mask.

5. The system of claim 4, to execute the computer-executable instructions to:
retrieve second image data acquired using a scanner, wherein the second image data represents an image of a hand of the user; and
process the second image data using a second neural network to determine the first image data, wherein the first image data depicts the hand in one or more of:
a predetermined pose relative to the scanner,
a predetermined articulation,
a predetermined illumination, or
a predetermined scale.

6. The system of claim 4, wherein the first algorithm comprises an orientation certainty level (OCL) algorithm, and wherein the first spatial mask associates OCL values with respective portions of the first image data.

7. The system of claim 4, to execute the computer-executable instructions to:
determine a first mask metric based on the first spatial mask;
determine the first mask metric is greater than a threshold value; and
wherein the determination of the second layer data is based on the first mask metric being greater than the threshold value.

8. The system of claim 4, during training of the first neural network, the second spatial mask is determined using a weighted average of a loss value associated with the second layer data.

9. The system of claim 4, to execute the computer-executable instructions to:
determine a first weight associated with the first spatial mask;
determine a second weight associated with the second spatial mask;
determine a combined spatial mask using instructions to:
multiply the first spatial mask by the first weight;
multiply the second spatial mask by the second weight; and
wherein the first neural network is trained to generate the first embedding vector using the combined spatial mask.

10. The system of claim 4, to execute the computer-executable instructions to:
determine a combined spatial mask based on the first spatial mask and the second spatial mask;
determine second image data; and
determine, using the first neural network and the combined spatial mask, a second embedding vector representative of one or more features within the second image data.

11. The system of claim 4, to execute the computer-executable instructions to:
determine a combined spatial mask based on the first spatial mask and the second spatial mask;
determine second image data associated with a second user;
determine, based on the combined spatial mask, a first value associated with a first portion of the second image data, wherein the first value is indicative of features represented in the first portion;
determine third image data associated with the second user;
determine, based on the combined spatial mask, a second value associated with a second portion of the third image data, wherein the second value is indicative of features represented in the second portion, and further wherein the first portion and the second portion are associated with a same portion of the user and the second user;
determine the second value is greater than the first value; and
determine, using the first neural network and the second portion of the third image data, a second embedding vector.

12. The system of claim 4, wherein the first image data is associated with a first modality and the first embedding vector is representative of one or more features of the user in the first modality, and the system to execute the computer-executable instructions to:
determine second image data of at least a portion of the user, wherein the second image data is associated with a second modality;
determine, using a second algorithm to process the second image data, a third spatial mask;
determine, using a third layer of a second neural network, third layer data based on the second image data and the third spatial mask;
determine, using a fourth layer of the second neural network, fourth layer data based on the third layer data;
determine, based on the fourth layer data, a fourth spatial mask; and
train, using the third spatial mask and the fourth spatial mask, the second neural network to generate a second embedding vector that is representative of one or more features of the user in the second modality.

13. A computer-implemented method comprising:
determining first image data of at least a portion of a user;
determining, using a first algorithm to process the first image data, a first spatial mask;

determining, using a first layer of a first neural network, first layer data based on the first image data;

determining, using a second layer of the first neural network, second layer data based on the first layer data;

determining, based on the second layer data, a second spatial mask; and determining a first embedding vector of the first image data using the first neural network, the first spatial mask, and the second spatial mask.

14. The method of claim 13, further comprising:

acquiring second image data using a scanner, wherein the second image data represents an image of a hand of the user; and processing the second image data using a second neural network to determine the first image data, wherein the first image data depicts the hand in one or more of:
a predetermined pose relative to the scanner,
a predetermined articulation,
a predetermined illumination, or
a predetermined scale.

15. The method of claim 13, wherein the first algorithm comprises an orientation certainty level (OCL) algorithm, and wherein the first spatial mask associates OCL values with respective portions of the first image data.

16. The method of claim 13, further comprising:
determining a first mask metric, based on the first spatial mask;
determining the first mask metric is greater than a threshold value; and
wherein the determining the second layer data is responsive to the first mask metric being greater than the threshold value.

17. The method of claim 13, wherein during training of the first neural network, the second spatial mask is determined using a weighted average of a loss value associated with the second layer data.

18. The method of claim 13, further comprising:
determining a first weight associated with the first spatial mask;
determining a second weight associated with the second spatial mask;
determining a combined spatial mask by:
multiplying the first spatial mask by the first weight;
multiplying the second spatial mask by the second weight; and
wherein the first neural network uses the combined spatial mask to determine the first embedding vector.

19. The method of claim 13, further comprising:
determining a combined spatial mask based on the first spatial mask and the second spatial mask;
determining second image data; and
determining, using the first neural network and the combined spatial mask, a second embedding vector representative of one or more features within the second image data.

20. The method of claim 13, further comprising:
determining a combined spatial mask based on the first spatial mask and the second spatial mask;
determining second image data associated with a second user;
determining, based on the combined spatial mask, a first value associated with a first portion of the second image data, wherein the first value is indicative of features represented in the first portion;
determining third image data associated with the second user;
determining, based on the combined spatial mask, a second value associated with a second portion of the third image data, wherein the second value is indicative of features represented in the second portion, and further wherein the first portion and the second portion are associated with a same portion of the user and the second user;
determining the second value is greater than the first value; and
determining, using the first neural network and the second portion of the third image data, a second embedding vector.

21. The method of claim 13, wherein the first image data is associated with a first modality and the first embedding vector is representative of one or more features of the user in the first modality;

the method further comprising:
determining second image data of at least a portion of the user, wherein the second image data is associated with a second modality;
determining, using a second algorithm to process the second image data, a third spatial mask;
determining, using a third layer of a second neural network, third layer data based on the second image data and the third spatial mask;
determining, using a fourth layer of the second neural network, fourth layer data based on the third layer data;
determining, based on the fourth layer data, a fourth spatial mask; and
determining a second embedding vector using the third spatial mask and the fourth spatial mask, wherein the second embedding vector is representative of one or more features of the user in the second modality.

* * * * *

UNITED STATES PATENT AND TRADEMARK OFFICE
CERTIFICATE OF CORRECTION

| | | |
|---|---|---|
| PATENT NO. | : 11,527,092 B1 | Page 1 of 1 |
| APPLICATION NO. | : 17/099074 | |
| DATED | : December 13, 2022 | |
| INVENTOR(S) | : Miriam Farber et al. | |

It is certified that error appears in the above-identified patent and that said Letters Patent is hereby corrected as shown below:

On the Title Page
(56) References Cited:
Other Publications add "Kanthi, et al., A 3D-Deep CNN Based Feature Extraction and Hyperspectral Image Classification", and "Kuzu, et al., Vein-Based Biometric Verification Using Densely-Connected Convolutional Autoencoder".

In the Claims
Column 17, Claim 2, Line 7:
Currently reads: "a first eigenvalue associated the gradient vector;"
When it should read: --a first eigenvalue associated with the gradient vector;--.

Signed and Sealed this
Tenth Day of January, 2023

Katherine Kelly Vidal
*Director of the United States Patent and Trademark Office*